Patented June 29, 1926.

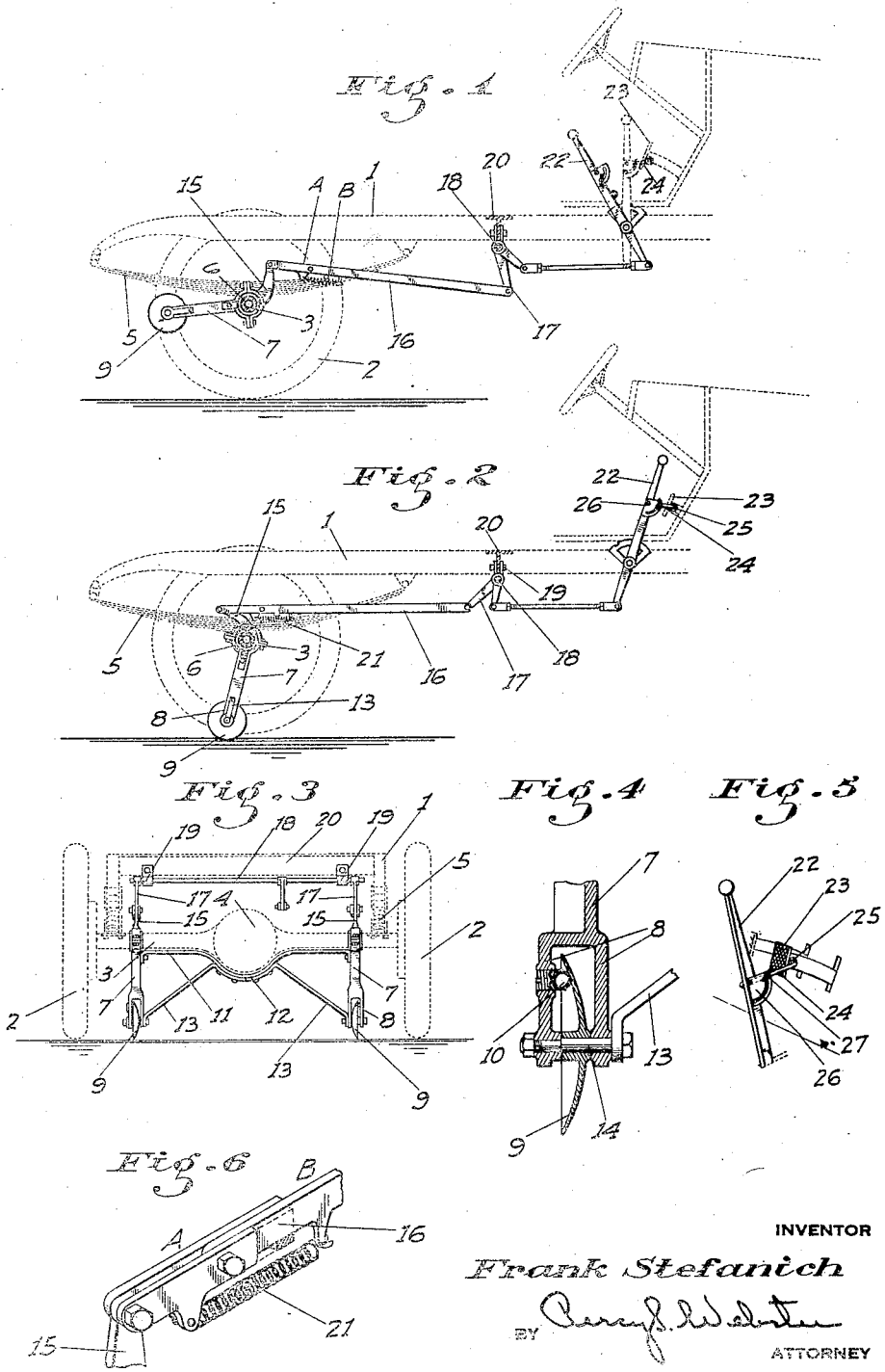

1,590,329

UNITED STATES PATENT OFFICE.

FRANK STEFANICH, OF FRESNO, CALIFORNIA.

NONSKID AUTOMOBILE ATTACHMENT.

Application filed May 5, 1924. Serial No. 711,108.

This invention relates to improvements in anti-skid devices of that general character in which non-skid discs are adapted to be lowered to the ground to frictionally engage the pavement or ground to prevent lateral or "skidding" movement of the rear wheels of automobiles.

The principal object of my invention is to provide a device of the above named character in which a pair of the non-skid discs are used adjacent the rear wheels of the car, and which are connected together so that they form a rigid unit, while at the same time the parts are comparatively light, and great weight to give the necessary strength is avoided.

Another object of the invention is to provide control means for the discs so arranged that the latter may be set in operative position by the hand of the driver, or when he applies the ordinary foot brake of the car.

This I believe to be a beneficial and important feature, since it is instinct with many drivers to grip the steering wheel with both hands and press on the brake pedal with the foot. I make use of this instinctive operation to apply the non-skid discs, and at the same time guard against the possible failure of the driver to make use of his hand to actuate the discs to avoid possible disaster.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figs. 1 and 2 are fragmentary side outlines of an automobile with my non skid device installed thereon in raised and lowered positions respectively.

Fig. 3 is a rear end view of the disc unit as mounted on the car.

Fig. 4 is an enlarged section of a disc and its supporting member.

Fig. 5 is a fragmentary perspective view showing the connection of the disc-control lever with a brake pedal.

Fig. 6 is a similar view of a special form of connecting-rod structure.

Referring now more particularly to the characters of reference in the drawings, the numeral 1 denotes the main frame of an automobile having rear wheels 2 between which are the axle and differential housings 3 and 4 respectively, the former being supported by the usual springs 5.

My device comprises bearing sleeves 6 fixed on the axle housings just inwardly of the springs, on which bearings are turnably mounted arms 7 which are forked at their lower ends as at 8 to receive turnable discs 9 therebetween. The arms are of such a length that when in a downward vertical position, the discs will project somewhat below the wheels 2, so as to take the weight of the car. The discs, which are preferably of concave form, are braced against lateral deflection adjacent their upper and inner faces by means of balls 10 or the like mounted in the adjacent fork-arms 8. To brace said arms together to form a rigid unit practically proof against lateral deflection or breakage, they are connected adjacent their upper ends by a bar 11, suitably curved intermediate its ends as at 12 to pass about and clear the differential housing 4. Diagonal braces 13 are connected to the curved section of the bar 11 and extend to the forks 8 of the arms 7, to which they are preferably connected by the disc-spindle bolts 14.

To raise and lower the discs, I provide the following structure: The arms 7 have extensions 15 projecting above the bearings 6, to the upper ends of which are connected connecting rod means 16 which extend to arms 17 mounted on a cross-shaft 18 journaled on brackets 19 fixed on a cross-frame member 20 of the car. Each connecting rod member preferably is of two parts A and B (see Fig. 6) connected together to form a downwardly breaking point with spring means 21 if necessary to restore the parts to, and maintain them in, their normally alined positions. These break-joint or hinge structures are near the extensions 15, the latter being so disposed relative thereto and to the main disc arms 7 that when the discs are down, an undue pressure resisting longitudinal movement of the discs will cause said joints to break and relieve or overcome this pressure, while at the same time the springs will cause the discs to reassume their normal positions when the resistance is removed or overcome, and thus maintain sufficient frictional contact with the ground to prevent lateral or side skidding of the car, which is the main and sole purpose of the device.

To turn the shaft 18 so as to move the rods 16 back and forth, I provide a lever 22 operatively connected thereto. This lever is pivoted onto the frame of the car and projects into the driver's compartment, preferably adjacent and to the right of the foot-brake pedal 23.

The lever is connected to the shaft 18 in such a manner that a forward movement of the lever lowers the disc-arms, and to enable a forward movement of the brake pedal to similarly move the said lever, the latter has a pivoted and forwardly extending arm 24 carrying a lug or roller 25 at its outer end adapted to pass under the pedal-pad so as to be engaged thereby (see Fig. 5). This arm is mounted in connection with a slotted plate 26 on the lever 22, the arm 24 having a clamping or adjustable bolt 27 passing through the slot, so that the arm may be moved clear of the pedal, or may be set in different positions to conform to different pedal settings as found on different cars.

The disc arms may be held up or in inoperative positions by any suitable yieldable means, such as springs, counterweights or automatically engaging and disengaging quadrant and ratchet means mounted in connection with the lever 22.

By mounting the disc-arms directly on the rear axle-housings, the need of brackets on the frame, and correspondingly longer arms with a greater tendency to weakness, is avoided, and the arms are supported from a member strong enough to well withstand the strains imposed thereon.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A non-skid attachment for automobiles including arms pivoted onto the vehicle, ground engaging members on the lower ends of the arms, a hand lever for lowering the arms, an extension projecting from the lever, and a member on said extension adapted to be engaged by the foot-brake pedal of the car when the latter is depressed.

2. A non-skid attachment for automobiles including arms pivoted onto the vehicle, ground engaging members on the lower ends of the arms, a hand lever for lowering the arms, an extension projecting from the lever, a member on said extension adapted to be engaged by the foot-brake pedal of the car when the latter is depressed, and means for enabling said member to be moved clear of the pedal at will.

3. A non-skid attachment for automobiles including arms pivoted onto the vehicle, ground engaging members on the lower ends of the arms, a hand lever for lowering the arms, an extension projecting from the lever, and pivoted thereon for adjustment in a vertical plane, and a member on said extension adapted to be engaged by the foot-brake pedal of the car when the latter is depressed and movable into such engageable position at will by adjustment of the extension.

In testimony whereof I affix my signature.

FRANK STEFANICH.